(12) United States Patent
Schleich

(10) Patent No.: US 10,871,204 B2
(45) Date of Patent: Dec. 22, 2020

(54) MANUAL TRANSMISSION UNIT WITH TRACTION GEAR

(71) Applicant: Bayerische Motoren Werke Aktiengesellschaft, Munich (DE)

(72) Inventor: Thomas Schleich, Weilheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 872 days.

(21) Appl. No.: 15/444,850

(22) Filed: Feb. 28, 2017

(65) Prior Publication Data

US 2017/0167573 A1 Jun. 15, 2017

Related U.S. Application Data

(63) Continuation of application No. PCT/EP2015/075946, filed on Nov. 6, 2015.

(30) Foreign Application Priority Data

Nov. 25, 2014 (DE) .................. 10 2014 223 912

(51) Int. Cl.
  *F16H 3/093* (2006.01)
  *F16H 37/02* (2006.01)
  *F16H 3/00* (2006.01)

(52) U.S. Cl.
  CPC ............ *F16H 3/093* (2013.01); *F16H 37/02* (2013.01); *F16H 3/006* (2013.01); *F16H 2003/0931* (2013.01); *F16H 2200/0056* (2013.01)

(58) Field of Classification Search
  CPC ........ F16H 3/093; F16H 37/02; F16H 37/021; F16H 2003/0931; F16H 2200/0056; F16H 3/006

USPC ........................................................... 74/331
See application file for complete search history.

(56) References Cited

U.S. PATENT DOCUMENTS

| 3,109,326 | A | * | 11/1963 | Holtan | F16H 37/046 475/293 |
| 3,968,704 | A | * | 7/1976 | Fogelberg | B60K 17/3467 74/376 |
| 8,191,441 | B2 | * | 6/2012 | Holmes | B60K 6/405 74/331 |

(Continued)

FOREIGN PATENT DOCUMENTS

| CH | 276505 | 7/1951 |
| CN | 101900187 A | 12/2010 |

(Continued)

OTHER PUBLICATIONS

International Search Report (PCT/ISA/210) issued in PCT Application No. PCT/EP2015/075946 dated Feb. 12, 2016 with English translation (five pages).

(Continued)

*Primary Examiner* — William C Joyce
(74) *Attorney, Agent, or Firm* — Crowell & Moring LLP

(57) ABSTRACT

A manual transmission unit has at least one input shaft, a transmission output shaft, a first intermediate shaft, a second intermediate shaft, a traction device, a plurality of gears and at least two traction wheels and a plurality of torque transmission devices for selectively connecting tooth and traction wheels to at least one of the shafts. Torque from the transmission input shaft can be transferred directly to the transmission input shaft by the traction device.

16 Claims, 1 Drawing Sheet

(56) References Cited

U.S. PATENT DOCUMENTS

| | | |
|---|---|---|
| 8,365,622 B2 | 2/2013 | Gadre |
| 2005/0050974 A1 | 3/2005 | Ibamoto et al. |
| 2010/0132492 A1 | 6/2010 | Holmes |
| 2014/0196556 A1 | 7/2014 | Beck et al. |
| 2014/0338497 A1 | 11/2014 | Michel et al. |

FOREIGN PATENT DOCUMENTS

| | | |
|---|---|---|
| CN | 102678841 A | 9/2012 |
| CN | 103547832 A | 1/2014 |
| CN | 103867656 A | 6/2014 |
| CN | 103998823 A | 8/2014 |
| DE | 192196 | 10/1907 |
| DE | 10 2009 055 885 A1 | 9/2010 |
| DE | 10 2010 010 914 A1 | 9/2011 |
| FR | 2 945 602 A1 | 11/2010 |
| FR | 2 976 039 A3 | 12/2012 |
| GB | 1 443 437 * | 7/1976 |
| JP | 64-35146 A | 2/1989 |
| WO | WO 2009/135807 A1 | 11/2009 |

OTHER PUBLICATIONS

German-language Written Opinion (PCT/ISA/237) issued in PCT Application No. PCT/EP2015/075946 dated Feb. 12, 2016 (11 pages).

German Office Action issued in counterpart German Application No. 10 2014 223 912.5 dated Sep. 15, 2015 (four pages).

Chinese-language Office Action issued in counterpart Chinese Application No. 201580049026.8 dated Jul. 4, 2018 with English translation (18 pages).

Chinese-language Office Action issued in counterpart Chinese Application No. 201580049026.8 dated Sep. 16, 2019 with English translation (seven (7) pages).

* cited by examiner

MANUAL TRANSMISSION UNIT WITH TRACTION GEAR

CROSS REFERENCE TO RELATED APPLICATIONS

This application is a continuation of PCT International Application No. PCT/EP2015/075946, filed Nov. 6, 2015, which claims priority under 35 U.S.C. § 119 from German Patent Application No. 10 2014 223 912.5, filed Nov. 25, 2014, the entire disclosures of which are herein expressly incorporated by reference.

BACKGROUND AND SUMMARY OF THE INVENTION

The invention relates to a manual transmission unit with a traction gear. A manual transmission unit of this kind known from U.S. Pat. No. 8,365,622 B2.

The invention is described below with reference to a manual transmission unit for a motor vehicle, in particular a passenger car, although this is not to be taken as a restriction of the invention.

In motor vehicle construction, efficiency and installation space requirements for drive systems are of great significance, in particular. Often it is necessary that it be possible to accommodate within a certain installation space a manual transmission unit that is used to adapt the speed/torque map of the power unit to the load requirement resulting from the driver demand, in particular the position of the accelerator pedal, road speed and further boundary conditions such as a rising or falling slope. It should furthermore be possible to operate the manual transmission unit with particularly high efficiency in order to allow a low energy requirement and low $CO_2$ emissions. Continuous development of different types of traction means makes it possible to combine traction gears with conventional gearwheel transmissions to form particularly efficient manual transmission units of compact construction.

U.S. Pat. No. 8,365,622 B2 shows a manual transmission unit having a traction gear, in particular a chain drive. In this case, one of the chain wheels can be connected to the transmission input shaft by means of a shifting device. Here, the chain drive transmits the driving power from the transmission input shaft to an intermediate shaft, from which the power can be transmitted via another gearwheel stage to a differential.

It is an object of the invention to provide a manual transmission unit with a particularly small installation space requirement, especially in the direction of the transmission input shaft.

This and other objects are achieved by a manual transmission unit in accordance with embodiments of the invention.

According to the invention, the driving power can be transmitted directly from a transmission input shaft to a transmission output shaft by a traction device. The terms "traction device" and "traction gear unit" should be taken as equivalents below. In particular, a manual transmission unit according to the invention provides the advantage of a particularly small axial installation space requirement (direction of extent in the direction of the transmission shafts). By virtue of a small axial installation space requirement, additional arrangement of power units, in particular for the hybridization of a drive system, is made possible, in particular. A small axial installation space requirement has a particularly advantageous effect, especially for front-mounted transverse drive concepts.

In the context to the invention, a manual transmission unit should be taken to mean a device for changing the speed ratio between a transmission input shaft and a transmission output shaft. By means of a manual transmission unit, it is possible, in particular, to achieve adaptation of the speed/torque characteristic of a power unit, in particular an internal combustion engine alone and/or in combination with an electric or hydraulic power unit, to the load requirement of a motor vehicle (driving resistance). A manual transmission unit preferably has a plurality of discrete speed ratios, referred to as gears or speeds. For this purpose, a manual transmission unit preferably has a plurality of transmission shafts, in particular transmission shafts arranged parallel to one another, and gearwheels or traction wheels, which, in particular, are arranged on the transmission shafts. Furthermore, a transmission unit of this kind preferably has a transmission case (housing). Here, the transmission case is preferably designed to accommodate the wheels and shafts and, on the other hand, is furthermore preferably designed to hold a lubricant, in particular a transmission oil.

The transmission unit according to the invention is preferably provided for longitudinal installation in a motor vehicle and, preferentially, for transverse installation. Here, longitudinal installation in this sense should be taken to mean that the transmission input shaft is aligned parallel to the main driving direction of the vehicle. Transverse installation should furthermore be taken to mean that the transmission input shaft is aligned transversely, preferably orthogonally, to the main driving direction.

In the context of the invention, a transmission input shaft should be taken to mean a device or a component by which a driving power (speed, torque) can be fed to the transmission unit, preferably from the power unit. As a further preference, the transmission input shaft can be connected to a power unit, in particular to an internal combustion engine. The transmission input shaft can preferably be connected to the internal combustion engine by way of a friction clutch or a torque converter. As a further preference, a vibration damper or absorber device, preferably at least part of a single- or multiple-mass flywheel, is arranged completely or partially on a transmission input shaft. In particular, the transmission input shaft is designed at least to receive a traction wheel and a gearwheel.

In the context of the invention, a transmission output shaft should be taken to mean a device or a component by which the driving power (speed, torque) can be passed out of the transmission unit. It is preferable if the speed and hence also the torque can be varied between the transmission input shaft and the transmission output shaft by way of the transmission unit. The driving power can preferably be transmitted in the direction of the driven wheel or wheels of a motor vehicle by way of the transmission output shaft. As a further preference, the driving power can be transmitted by the transmission output shaft to at least one Cardan shaft or, preferably, a differential. In particular, the transmission output shaft is designed at least to receive a traction wheel and a gearwheel.

In the context of the invention, an intermediate shaft should be taken to mean a device or a component which is arranged within the transmission unit and which is provided for transmission of at least some of the driving power. As a further preference, the intermediate shaft is designed to receive one or more gearwheels, which interact or mesh with one or more gearwheels mounted on the transmission input shaft or transmission output shaft in order to vary the speed and torque.

In the context of the invention, the meshing of two gearwheels should be taken to mean that the gearwheels make contact and, in particular, roll upon one another to transmit movement or power.

As a further preference, an intermediate shaft in the context of the invention can be taken to mean a countershaft. As a further preference, this intermediate shaft can be taken to mean a component shaft of a range-change transmission. In this case, an intermediate shaft is arranged between these two shafts in respect of the power flow from the transmission input shaft to the transmission output shaft.

In the context of the invention, a traction device should be taken to mean a traction gear. A traction gear preferably has at least one traction device, preferably a band, preferably a belt and particularly preferably a chain. As a further preference, a traction device should preferably be taken to mean an endless device, preferably with frictional, preferably positive and particularly preferably positive/frictional power transmission to traction wheels. As a further preference, a belt should be taken to mean a flat belt, preferably a V-belt and particularly preferably a poly-V-belt or toothed belt. A chain is preferably taken to refer to tension or thrust member belts, preferably driving chains and particularly preferably pin-joint or rocker-joint chains with or without teeth.

A traction device furthermore has at least two traction wheels. A traction wheel is preferably taken to mean a belt or chain wheel. As a further preference, a traction wheel should also be taken to mean a tension pulley or tension wheel, wherein a tension wheel or tension pulley of this kind is not involved in the power transmission of the traction device as such but is merely provided for correct operation of the traction gear. As a further preference, a traction device guide, preferably at least one slide rail, is provided. Of at least two of said traction wheels, one is arranged on the transmission input shaft and one on the transmission output shaft.

In the context of the invention, a torque transmission device should be taken to mean a device by which a power flow (torque, speed) can be interrupted or established. This power flow can preferably be established or interrupted by a frictional connection, preferably a positive connection and particularly preferably a frictional/positive connection. A torque transmission device is preferably selected from a group of devices which has at least the following elements:
 a synchronization device, preferably a cone-type synchronization device,
 a dog clutch,
 a tooth clutch,
 a sliding collar,
 a frictional multiplate or centrifugal clutch,
 hydrodynamic or hydrostatic clutches, and
 viscous couplings.

In a manual transmission unit according to the invention, it is possible to make "multiple" use of at least one or more of the torque transmission devices. For example, it is possible to use one of the torque transmission devices to activate a first gear and a further, second gear, and, in particular, it is thereby made possible to make the manual transmission unit more compact.

In the context of the invention, the selective connection of gearwheels and traction wheels to at least one of these transmission shafts should be taken to mean that a power flow can be established between one of the transmission shafts and at least one of the gearwheels or traction wheels by means of one of the torque transmission devices. As a further preference, it should be taken to mean that two wheels can be connected selectively (gearwheels or traction wheels) to one of the transmission shafts by means of a torque transmission device in such a way that either one (gearwheel or traction wheel) or the other (gearwheel or traction wheel) is connected to the transmission shaft.

A torque transmission device preferably has a sliding collar section, in which it is connected for conjoint rotation to one of the transmission shafts and is supported in such a way as to be movable in the direction of the rotational axis of the transmission shaft, that is to say, in particular, axially. As a further preference, the torque transmission device has a torque transmission region, preferably two torque transmission regions, which can be brought into connection, in particular alternately, with one or the other gearwheel or traction wheel, in particular for power transmission to one of the transmission shafts.

In the context of the invention, direct transmission of a torque from the transmission input shaft to the transmission output shaft should be taken to mean that the power flow between these two transmission shafts takes place directly, that is to say, in particular, not along the indirect path via one of the intermediate shafts. During this direct power transmission, the entire driving power, minus unavoidable losses, is preferably transmitted from the transmission input shaft to the transmission output shaft by the traction means.

As a further preference, the torque is transmitted directly from the transmission input shaft to the transmission output shaft when one of the torque transmission devices connects a first of the traction wheels to the transmission input shaft and the torque is transmitted by said traction wheel, via the traction device (band, belt, chain), directly to the second traction wheel, which is arranged on the transmission output shaft.

In the context of the invention, a transmission cross section plane should be taken to mean an imaginary plane which is arranged orthogonally to the transmission input shaft. As a further preference, the transmission cross section plane is arranged orthogonally to the transmission input shaft and to the transmission output shaft and to at least one of the intermediate shafts or preferably to two or more intermediate shafts.

In the context of the invention, a single point in the transmission cross section plane should be taken to mean the point at which a rotational axis about which one of the transmission shafts (transmission input shaft, transmission output shaft, first, second intermediate shaft) is rotatably mounted penetrates said plane.

In the context of the invention, a wheel plane should be taken to mean a plane parallel to the transmission cross section plane. Individual wheel planes are preferably spaced apart axially. In the sense according to the invention, axial should be taken to mean the direction normal to the transmission cross section plane.

As a further preference, a wheel plane intersects two gearwheels or traction wheels, wherein a driving power (speed, torque) can be transmitted between these two wheels. In the context of the invention, these two wheels are then referred to as wheels arranged in said one wheel plane. Gearwheels arranged in one wheel plane preferably mesh, or the two traction wheels can be contacted by the same traction device for power transmission.

A wheel plane should therefore preferably be taken to mean a common section plane of two gearwheels, wherein one gearwheel is arranged on the transmission input shaft or transmission output shaft and the other gearwheel is arranged on one of the intermediate shafts.

The wheel plane should preferably be taken to mean the plane of symmetry of at least one of the gearwheels or traction wheels, preferably of both gearwheels or traction wheels. As a further preference, a wheel plane is arranged at least in a region of the gearwheels or traction wheels which is designed for power transmission.

In respect of gearwheels, it is, in particular, the toothing which should be taken to mean the region designed for power transmission (active toothing width). In respect of traction wheels, it is, in particular, the region which is designed to make contact with the traction device (band, belt, chain) which should be taken to mean the region designed for power transmission.

In a preferred embodiment, the resulting penetration points of the four transmission shafts (transmission input shaft, transmission output shaft, first and second intermediate shafts) are incongruent points in the transmission cross section plane. This should be taken to mean, in particular, that the four points are each spaced apart in the common plane. In particular in virtue of the fact that the penetration points are spaced apart and the transmission shafts are, as a result, likewise spaced apart, in particular are not arranged coaxially with one another, a particularly compact design can be achieved and hence an improved manual transmission can be provided.

In a preferred embodiment, the manual transmission unit has a multiplicity of wheel planes but preferably four wheel planes (first, second, third, fourth) for gearwheels. At least two intermeshing gearwheels are preferably arranged in a wheel plane. As a further preference, three or more intermeshing gearwheels are arranged in a wheel plane. More than two intermeshing gearwheels in a wheel plane should be taken to be, in particular, a gear train. A gear train for the production of a reverse ratio (reverse gear) is preferably arranged in a common wheel plane. The wheel planes are preferably arranged parallel to the transmission cross section plane and are spaced apart in the axial direction. As a further preference, the transmission unit has a first and a second reverse gear.

At least two traction wheels are preferably arranged in a fifth wheel plane. The fifth plane is preferably spaced apart from the four wheel planes in the axial direction. The fifth wheel plane is preferably arranged between two of the four other wheel planes in the axial direction. As a further preference, the wheel plane for accommodating the traction wheels is arranged between two wheel planes for accommodating gearwheels. In particular in virtue of the fact that only five wheel planes are formed, a particularly small installation space requirement can be achieved in the axial direction and hence an improved manual transmission unit can be provided.

In a preferred embodiment, a first and a second input gearwheel are arranged on the transmission input shaft. The input wheels are preferably connected for conjoint rotation to the shaft. The first and the second input gearwheel are preferably connected permanently for conjoint rotation to the transmission input shaft. Preferably, at least one of the input gearwheels is connected to the transmission input shaft frictionally, in particular by means of a press fit, preferably positively, in particular by means of a splined shaft connection, or particularly preferably materially, in particular integrally or preferably by means of a welded joint. As a further preference, at least one of the gearwheels is connected to the transmission input shaft by a combination of two of the abovementioned types of connection. Particularly by means of the permanent connection of the input gearwheels for conjoint rotation to the transmission input shaft, a particularly simple construction of the manual transmission unit is made possible.

In a preferred embodiment, the first input gearwheel is arranged in the fourth wheel plane and the second input gearwheel is arranged in the third wheel plane. The transmission input shaft preferably enters the manual transmission unit on a transmission input side and, as a further preference, the transmission input side faces the power unit for providing the driving power. Among the wheel planes provided to accommodate the gearwheels, it is preferably the fourth wheel plane which is at the greatest distance from the transmission input side. Tests have shown that such an arrangement of the input gearwheels has a particularly advantageous effect on the operational reliability of the transmission unit.

In a preferred embodiment, a first and a second output gearwheel are arranged on the transmission output shaft. The output gearwheels are preferably connected for conjoint rotation to the shaft. The first and the second output gearwheel are preferably connected permanently for conjoint rotation to the transmission output shaft. Preferably, at least one of the output gearwheels is connected to the transmission output shaft frictionally, in particular by means of a press fit, preferably positively, in particular by means of a splined shaft connection, or particularly preferably materially, in particular integrally or preferably by means of a welded joint. As a further preference, at least one of the gearwheels is connected to the transmission output shaft by a combination of two of the abovementioned types of connection. Particularly by means of the permanent connection of the output gearwheels for conjoint rotation to the transmission output shaft, a particularly simple construction of the manual transmission unit is made possible. As a further preference, this makes it possible to arrange the torque transmission devices, in particular for the gearwheels, on three or fewer, preferably on two, transmission shafts and hence to enable particularly simple control thereof.

In a preferred embodiment, the first output gearwheel is arranged in the second wheel plane and the second output gearwheel is arranged in the first wheel plane. Among the wheel planes provided to accommodate the gearwheels, it is preferably the first wheel plane which is at the shortest distance from the transmission input side. Tests have shown that such an arrangement of the output gearwheels has a particularly advantageous effect on the operational reliability of the transmission unit.

In a preferred embodiment, a first, second, third and fourth intermediate gearwheel are arranged on the first intermediate shaft. In this case, it is preferable if the first intermediate gearwheel is arranged in the fourth wheel plane, the second intermediate gearwheel is arranged in the third wheel plane, the third intermediate gearwheel is arranged in the second wheel plane, and the fourth intermediate gearwheel is arranged in the first wheel plane. The first to fourth intermediate gearwheels are preferably designed to make continuous contact with the respective input and output gearwheels arranged in the same wheel plane. Particularly by means of such a distribution of the intermediate gearwheels, a particularly advantageous embodiment of the manual transmission unit is obtained.

In another preferred embodiment, a fifth, sixth, seventh and eighth intermediate gearwheel are arranged on the second intermediate shaft. In this case, it is preferable if the fifth intermediate gearwheel is arranged in the fourth wheel plane, the sixth intermediate gearwheel is arranged in the third wheel plane, the seventh intermediate gearwheel is arranged in the second wheel plane, and the eighth intermediate gearwheel is arranged in the first wheel plane. The fifth to eighth intermediate gearwheels are preferably designed to make continuous contact (mesh) with the respective input and output gearwheels arranged in the same wheel plane. Particularly by means of such a distribution of the intermediate gearwheels, a particularly advantageous embodiment of the manual transmission unit is obtained.

In a preferred embodiment, at least one or more of the intermediate gearwheels can preferably be connected to the respective intermediate shafts in a torque-transmitting manner, preferably by means of a respective torque transmission device. The first and the second intermediate gearwheel can preferably be connected selectively to the first intermediate shaft by means of a first torque transmission device. The third and the fourth intermediate gearwheel can preferably be connected selectively to the first intermediate shaft by means of a second torque transmission device. The fifth and the sixth intermediate gearwheel can preferably be connected selectively to the second intermediate shaft by means of a third torque transmission device. The seventh and the eighth intermediate gearwheel can preferably be connected selectively to the second intermediate shaft by means of a fourth torque transmission device. Particularly through the use of a torque transmission device for selectively connecting two intermediate gearwheels to an intermediate shaft, a particularly space-saving and hence compact construction of the manual transmission unit can be achieved.

In a preferred embodiment, the first traction wheel is arranged on the transmission input shaft. The second traction wheel is preferably arranged on the transmission output shaft. As a further preference, the first traction wheel, or preferably the second traction wheel, can be connected to the transmission input shaft or the transmission output shaft in a torque-transmitting manner by means of a fifth torque transmission device. Particularly owing to the lower torques which occur during operation on the transmission input shaft, it is advantageous to arrange the fifth torque transmission device there. During operation, the transmission output shaft rotates at a lower speed than the transmission input shaft and, for this reason in particular, control of the torque transmission device arranged on said shaft is simpler than when it is arranged on the transmission input shaft.

As a further preference, the first and the second traction wheel can each be connected to one of the transmission shafts by means of a respective torque transmission device. In particular in virtue of the interruptibility of the power flow between the traction wheels and at least one or both of the transmission shafts, particularly efficient operation of the manual transmission unit is made possible and hence an improved manual transmission unit can be provided.

In a preferred embodiment, a reverse ratio gearwheel is arranged in one of the wheel planes (first, second, third or fourth). As a further preference, the reverse ratio gearwheel meshes with one of the intermediate gearwheels and one of the output gearwheels. Particularly in virtue of an arrangement of the reverse ratio gearwheel between one of the intermediate gearwheels and one of the output gearwheels, a particularly compact construction of the manual transmission unit is made possible.

In another preferred embodiment, the transmission output shaft has two sections for outputting the driving power in the direction of the driven wheels. It is preferable if one of the sections is arranged on the transmission input side of the manual transmission unit and a second is arranged on the opposite side of the manual transmission unit from the above side. Particularly in virtue of such an embodiment of the transmission output shaft or transmission output shafts, it is possible to distribute the driving power particularly well between the left-hand and right-hand sides of the motor vehicle if the manual transmission unit is installed transversely to the main driving direction of the vehicle, and, in the case of longitudinal installation, it is possible to distribute the driving power particularly well between the front and rear (all-wheel drive).

In a preferred embodiment, a manual transmission unit according to the invention is part of a drive system for a motor vehicle, in particular a motor car. Connecting means in this sense are preferably taken to mean Cardan shafts, shafts, transmission units, in particular a differential.

In another preferred embodiment, the manual transmission unit does not have a traction device. The topology of the remainder of the manual transmission unit preferably remains unchanged. The gear eliminated by the omission of the traction device is preferably not replaced, i.e. the manual transmission unit has one less gear (ratio) than a manual transmission unit of the same construction. Particularly in virtue of the omission of the traction device, it is also possible to eliminate shifting devices and to reduce the complexity of the manual transmission unit. In an alternative embodiment, the traction device is replaced by a gearwheel pair or by a sprocket chain. Particularly with this alternative, the known transmission topology can continue to be used, and the gear (ratio) eliminated by the omission of the traction device can be formed by a gearwheel ratio.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
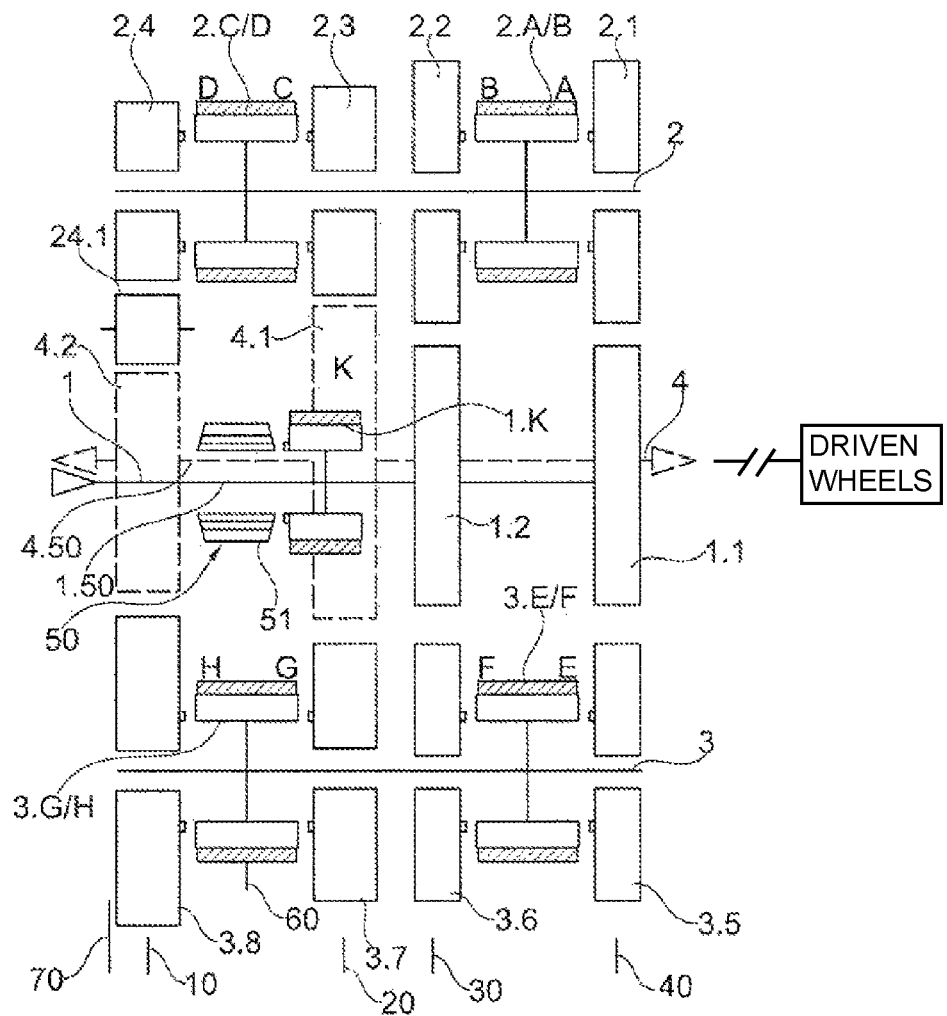
FIG. 1 is a schematic diagram of a longitudinal section through a manual transmission unit according to an embodiment of the invention.
FIG. 2 is a shift pattern for a manual transmission unit according to an embodiment of the invention.

A longitudinal section through a manual transmission unit is illustrated in FIG. 1. Both the wheel planes 10, 20, 30, 40, 60 and the transmission cross section plane 70 appear only as a straight line in this illustration. Here, the planes extend across the cross-sectional area of the manual transmission unit in the respective plane. The manual transmission unit has seven forward gears and one reverse gear. One forward gear of the seven forward gears can be formed by means of the traction gear 50.

The transmission shafts (1 to 4) are accommodated and rotatably mounted in a transmission case (not shown). A first 1.1 and a second 1.2 input gearwheel are arranged on the transmission input shaft. The gearwheels (1.1, 1.2) are formed integrally with the transmission input shaft 1. A first 4.1 and a second 4.2 output gearwheel are arranged on the transmission output shaft 4. These gearwheels (4.1, 4.2) are formed integrally with the transmission output shaft.

The first input gearwheel 1.1 is arranged in the fourth wheel plane 40 and is in permanent mesh with the first intermediate gearwheel 2.1, which is arranged on the first intermediate shaft 2, and with the fifth intermediate gearwheel 3.5, which is arranged on the second intermediate shaft 3. The second input gearwheel 1.2 is arranged in the third wheel plane 30 and is in permanent mesh with the second intermediate gearwheel 2.2, which is arranged on the first intermediate shaft 2, and with the sixth intermediate gearwheel 3.6, which is arranged on the second intermediate shaft 3.

The first output gearwheel 4.1 on the transmission output shaft 4 is arranged in the second wheel plane 20 and is in permanent mesh with the third intermediate gearwheel 2.3, which is arranged on the first intermediate shaft 2, and with the seventh intermediate gearwheel 3.7, which is arranged on the second intermediate shaft 3. The second output gearwheel 4.2 on the transmission output shaft 4 is arranged in the first wheel plane 10 and is in permanent mesh with the reverse ratio gearwheel 9, and the latter is in permanent mesh with the fourth intermediate gearwheel 2.4, which is arranged on the first intermediate shaft 2. Furthermore, output gearwheel 4.2 is in permanent mesh with the eighth intermediate gearwheel 3.8, which is arranged on the second intermediate shaft 3.

In this case, gearwheels arranged in two different wheel planes form one gear ratio in each case. To form a gear ratio, the gearwheels (2.1, 2.2, 2.3, 2.4, 3.5, 3.6, 3.7, 3.8) on the intermediate shafts (2, 3) can be connected to the intermediate shafts (2, 3) in a torque-transmitting manner by means of torque transmission devices (2.A/B, 2.C/D, 3.E/F, 3.G/H).

By means of torque transmission device 2.A/B, either the first intermediate gearwheel 2.1 or the second intermediate gearwheel 2.2 can be connected to the first intermediate shaft 2 in a torque-transmitting manner. To produce the torque-transmitting connection, torque transmission device 2.A/B and gearwheels 2.1 and 2.2 make contact with one another in torque transmission regions A or B.

By means of torque transmission device 2.C/D, either the third intermediate gearwheel 2.3 or the fourth intermediate gearwheel 2.4 can be connected to the first intermediate shaft 2 in a torque-transmitting manner. To produce the torque-transmitting connection, torque transmission device 2.C/D and gearwheels 2.3 and 2.4 make contact with one another in torque transmission regions C or D.

By means of torque transmission device 2.E/F, either the fifth intermediate gearwheel 3.5 or the sixth intermediate gearwheel 3.6 can be connected to the second intermediate shaft 3 in a torque-transmitting manner. To produce the torque-transmitting connection, torque transmission device 2.E/F and gearwheels 3.5 and 3.6 make contact with one another in torque transmission regions E or F.

By means of torque transmission device 2.G/H, either the seventh intermediate gearwheel 3.7 or the eighth intermediate gearwheel 3.8 can be connected to the second intermediate shaft 3 in a torque-transmitting manner. To produce the torque-transmitting connection, torque transmission device 2.G/H and gearwheels 3.7 and 3.8 make contact with one another in torque transmission regions G or H.

The traction device 50 has a chain 51 and a chain wheel 1.50, which is arranged on the transmission input shaft 1, and a chain wheel 4.50, which is arranged on the transmission output shaft 4. The chain wheels 1.50, 4.50 are arranged in the fifth wheel plane 60. Chain wheel 1.50 can be connected to the transmission input shaft 1 in a torque-transmitting manner by means of torque transmission device 1.K. To produce the torque-transmitting connection, torque transmission device 1.K and chain wheel 1.50 make contact with one another in torque transmission region K.

In contrast to power transmission by means of the above-described gear stages in wheel planes 10, 20, 30, 40, it is possible to form a further gear ratio in wheel plane 60 by means of the traction device 50, making it possible to achieve seven forward gears and one reverse gear with this manual transmission unit according to the invention.

FIG. 2 shows a shift diagram for a manual transmission unit according to the invention. Here, an empty field in the illustration means that no torque transmission is possible. In this case, only the shift points between the respective torque transmission device, the gearwheel or traction wheel and the respective transmission shaft are indicated by A to H and K. Torque transmission device 2.A/B is arranged on the first intermediate shaft 2 and serves torque transmission regions A and B. Torque transmission device 2.C/D is arranged on the first intermediate shaft 2 and serves torque transmission regions C and D. Torque transmission device 3.E/F is arranged on the second intermediate shaft 3 and serves torque transmission regions E and F. Torque transmission device 3.G/H is arranged on the second intermediate shaft 3 and serves torque transmission regions G and H. Torque transmission device 1.K is arranged on the transmission input shaft 1 and serves torque transmission point K. Torque transmission devices of this kind for "dual shifts" are known from the prior art.

In the context of the present invention, "serves" should be taken to mean that the torque transmission device allows or interrupts torque transmission from the respective gearwheel or traction wheel to one of the transmission shafts.

In the present case, the sixth gear is formed by means of the traction gear 50 and, for this, only torque transmission device 4.50 is actuated, while all the others are unactuated. For all the other gears (first to fifth, seventh and reverse), two torque transmission devices are actuated in each case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A manual transmission unit, comprising:
    a plurality of transmission shafts, including: a transmission input shaft, a first intermediate shaft, a second intermediate shaft, and a transmission output shaft, each transmission shaft having arranged thereon a respective pair of gearwheels of a plurality of gearwheels, wherein each pair of gearwheels of the intermediate shafts is associated with a respective torque transmission device that selectively connects the associated pair of gearwheels to the respective intermediate transmission shaft on which the pair of gearwheels is arranged; and
    a traction device comprising an endless belt and at least two traction wheels, wherein the traction device is associated with a traction torque transmission device that selectively connects a first traction wheel of the at least two traction wheels to at least one of: the transmission input shaft and the transmission output shaft, such that a torque is transmittable directly from the transmission input shaft to the transmission output shaft by way of the traction device, wherein the traction torque transmission device actuates only one gear of the manual transmission unit.

2. The manual transmission unit according to claim 1, wherein the manual transmission unit has a transmission cross section plane orthogonal to the transmission input shaft, wherein the transmission cross section plane also orthogonally intersects the transmission output shaft and the first and second intermediate shafts,
wherein each of the transmission shafts is mounted so as to be rotatable about a respective rotational axis,
wherein the rotational axes can be represented as single points in the transmission cross section plane, and
wherein the four points are incongruent with respect to one another.

3. The manual transmission unit according to claim 2,
wherein the plurality of gearwheels are each respectively arranged in a first wheel plane, a second wheel plane, a third wheel plane, or a fourth wheel plane,
wherein the first wheel plane, the second wheel plane, the third wheel plane, and the fourth wheel plane are spaced parallel to the transmission cross section plane and axially apart from one another,
wherein the traction wheels are arranged in a fifth wheel plane, and
wherein the fifth plane is spaced apart from the four planes and is arranged between two wheel planes.

4. The manual transmission unit according to claim 3,
wherein a reverse ratio gearwheel is arranged in one of: the first gearwheel plane, the second gearwheel plane, the third gearwheel plane, or the fourth gearwheel plane, and
wherein the reverse ratio gearwheel meshes with (a) one of the gearwheels associated with the first intermediate shaft or the second intermediate shaft, and (b) one of the gearwheels associated with the output transmission shaft.

5. The manual transmission unit according to claim 3,
wherein a first input gearwheel and a second input gearwheel are each arranged on the transmission input shaft, and
wherein the first input gearwheel and the second input gearwheel are each connected for conjoint rotation to the transmission input shaft.

6. The manual transmission unit according to claim 5,
wherein the first input gearwheel is arranged in the fourth wheel plane, and
wherein the second input gearwheel is arranged in the third wheel plane.

7. The manual transmission unit according to claim 5,
wherein a first output gearwheel and a second output gearwheel are each arranged on the transmission output shaft, and
wherein the first output gearwheel and the second output gearwheel are each connected for conjoint rotation to the transmission output shaft.

8. The manual transmission unit according to claim 7,
wherein the first output gearwheel is arranged in the second wheel plane, and
wherein the second output gearwheel is arranged in the first wheel plane.

9. The manual transmission unit according to claim 7,
wherein a first intermediate gearwheel, a second intermediate gear wheel, a third intermediate gearwheel, and a fourth intermediate gearwheel are each arranged on the first intermediate shaft, and
wherein the first intermediate gearwheel is arranged in the fourth wheel plane, the second intermediate gearwheel is arranged in the third wheel plane, the third intermediate gearwheel is arranged in the second wheel plane, and the fourth intermediate gearwheel is arranged in the first wheel plane.

10. The manual transmission unit according to claim 9,
wherein a fifth intermediate gearwheel, a sixth intermediate gearwheel, a seventh intermediate gearwheel and an eighth intermediate gearwheel are each arranged on the second intermediate shaft, and
wherein the fifth intermediate gearwheel is arranged in the fourth wheel plane, the sixth intermediate gearwheel is arranged in the third wheel plane, the seventh intermediate gearwheel is arranged in the second wheel plane, and the eighth intermediate gearwheel is arranged in the first wheel plane.

11. The manual transmission unit according to claim 10,
wherein the first intermediate gearwheel and the second intermediate gearwheel are connectable selectively to the first intermediate shaft by a first torque transmission device,
wherein the third intermediate gearwheel and fourth intermediate gearwheel are connectable selectively to the first intermediate shaft by a second torque transmission device,
wherein the fifth intermediate gearwheel and sixth intermediate gearwheel are connectable selectively to the second intermediate shaft by a third torque transmission device, and
wherein the seventh intermediate gearwheel and eighth intermediate gearwheel are connectable selectively to the second intermediate shaft by a fourth torque transmission device.

12. The manual transmission unit according to claim 10,
wherein the first traction wheel is arranged on the transmission input shaft,
wherein a second traction wheel of the at least two traction wheels is arranged on the transmission output shaft, and
wherein the first traction wheel is connectable to the transmission input shaft in a torque-transmitting manner by the traction torque transmission device.

13. The manual transmission unit according to claim 12,
wherein a reverse ratio gearwheel is arranged in one of: the first gearwheel plane, the second gearwheel plane, the third gearwheel plane, or the fourth gearwheel plane, and
wherein the reverse ratio gearwheel meshes with one of: the first intermediate gearwheel, the second intermediate gearwheel, the third intermediate gearwheel, the fourth intermediate gearwheel, the fifth intermediate gearwheel, the sixth intermediate gearwheel, the seventh intermediate gearwheel, or the eighth intermediate gearwheel, and one of: the first output gearwheel or the second output gearwheel.

14. The manual transmission unit according to claim 1,
wherein the first traction wheel is arranged on the transmission input shaft,
wherein a second traction wheel of the at least two traction wheels is arranged on the transmission output shaft, and
wherein the first traction wheel is connectable to the transmission input shaft in a torque-transmitting manner by the traction torque transmission device.

15. A drive system for a motor vehicle, comprising:
a manual transmission unit according to claim 1;
at least one power unit;
at least one drivable wheel/tire combination; and
a connector for mechanical power transmission from the manual transmission unit to the wheel/tire combination.

16. The drive system according to claim 15, wherein the at least one power unit is an internal combustion engine.

\* \* \* \* \*